US008498496B2

(12) United States Patent
Messina et al.

(10) Patent No.: US 8,498,496 B2
(45) Date of Patent: Jul. 30, 2013

(54) METHOD AND APPARATUS FOR FILTERING RED AND/OR GOLDEN EYE ARTIFACTS

(75) Inventors: Giuseppe Messina, Catania (IT); Daniele Ravi, Messina (IT); Mirko Guarnera, Gela (IT); Giovanni Maria Farinella, Caltanissetta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 291 days.

(21) Appl. No.: 12/969,252

(22) Filed: Dec. 15, 2010

(65) Prior Publication Data
US 2011/0158511 A1 Jun. 30, 2011

(30) Foreign Application Priority Data

Dec. 18, 2009 (IT) .............................. RM2009A0669

(51) Int. Cl.
*G06K 9/40* (2006.01)
*G06K 9/62* (2006.01)
*G06K 9/00* (2006.01)
*G06K 9/56* (2006.01)

(52) U.S. Cl.
USPC ............ 382/275; 382/224; 382/165; 382/205

(58) Field of Classification Search
None
See application file for complete search history.

(56) References Cited

U.S. PATENT DOCUMENTS

| | | | |
|---|---|---|---|
| 6,407,777 B1 | 6/2002 | DeLuca | 348/576 |
| 2002/0136450 A1 | 9/2002 | Chen et al. | 382/165 |
| 2003/0007687 A1 | 1/2003 | Nesterov et al. | 382/167 |
| 2007/0140556 A1* | 6/2007 | Willamowski et al. | 382/167 |
| 2008/0137944 A1* | 6/2008 | Marchesotti et al. | 382/167 |
| 2009/0148072 A1 | 6/2009 | Brand et al. | 382/307 |

FOREIGN PATENT DOCUMENTS

| | | |
|---|---|---|
| EP | 1296279 A2 | 3/2003 |
| WO | 2006045441 A1 | 5/2006 |

OTHER PUBLICATIONS

Battiato, Red-Eyes Removal through Cluster-Based Boosting on Gray Codes, Jul. 29, 2010, EURASIP Journal on Image and Video Processing vol. 2010, pp. 1-11.*

(Continued)

*Primary Examiner* — Bhavesh Mehta
*Assistant Examiner* — David F Dunphy
(74) *Attorney, Agent, or Firm* — Seed IP Law Group PLLC

(57) ABSTRACT

Processing method of a digital image to filter red and/or golden eye artifacts, the digital image comprising a plurality of pixel each comprising at least one digital value represented on a plurality of bits, the method comprising: a step of selecting at least one patch of pixels of the digital image comprising pixels potentially representative of a red and/or golden eye artifact; a step of classifying the at least one patch of pixels as "eye" or "non-eye"; a step of filtering said potentially representative pixels if said patch of pixels is classified as "eye"; wherein the classifying step comprises the operations of: converting the digital values of said patch of pixels into a Gray Code representation, overall obtaining a plurality of bit maps from said patch of pixels, each bit map being associated with a respective bit of said Gray Code; an operation of individually comparing said bit maps with corresponding bit map models belonging to a patch classifier produced by a statistical analysis of bit maps obtained by converting patches of pixels of digital images containing or not red and/or golden eye artifacts into said Gray Code representation.

29 Claims, 11 Drawing Sheets

OTHER PUBLICATIONS

International Search Report and Written Opinion for Italian Application No. ITRM20090669 printed May 31, 2010, 13 pages.

Clark, "Standard n-tuple classifiers," [Online] Jul. 24, 1997, Retrieved from the Internet: URL: http://www.bmva.ac.uk/bmvc/1997/papers/113/node3.html>, 4 pages.

Duda et al., "Pattern classification, passage," Jan. 1, 2001, New York, John Wiley & Sons, US, pp. VII-XVI, 10 pages.

Fisher et al., "Connected Components Labeling," [Online] 2003, Retrieved from the Internet: URL: http://homepages.inf.ed.ac.uk/rbf/HIPR2/label.htm>, 8 pages.

Hogue et al., "Face Recognition Using the Moving Window Classifier," Proceedings of British Machine Vision Conference, [Online] 2000, Retrieved from the Internet: URL: http://www.bmva.ac.uk/bmvc/2000/papers/p32.pdf, 10 pages.

Ko et al., "Fast Digital Image Stabilizer Based on Gray-Coded Bit-Plane Matching," IEEE Transactions on Consumer Electronics, 45(3): 598-603, Aug. 1999.

Safonov, "Automatic Red Eye Detection," GraphiCon, [Online] 2007, Retrieved from the Internet: URL: http://www.graphicon.ru/2007/proceedings/Papers/Paper_11.pdf>, 8 pages.

Shan et al., "Image Retrieval Based on Bit-Plane Distribution Feature," 2009 Sixth International Conference on Fuzzy Systems and Knowledge Discovery, IEEE: 388-391, Aug. 14, 2009.

Friedman et al., "Additive Logistic Regression: A Statistical View of Boosting," The Annals of Statistics, 28(2), pp. 337-374, 2000.

Gaubatz et al., "Automatic Red-Eye Detection and Correction," Proc. of the IEEE Conf. Image Processing, pp. 804-807, 2002.

Safonov et al., "Automatic red eye correction and its quality metric," Proceedings—SPIE the International Society for Optical Engineering, vol. 6807, 10 pages, 2008.

Schapire, "The Strength of Weak Learnability," Machine Learning, 5, pp. 197-227, 1990.

Volken et al., "Automatic Red-Eye Removal based on Sclera and Skin Tone Detection," CGIV 2006, Society for Imaging Science and Technology, pp. 359-364, 2006.

* cited by examiner

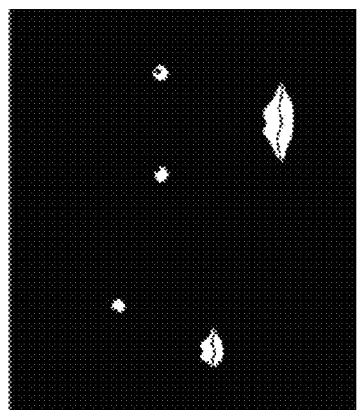
FIG. 6
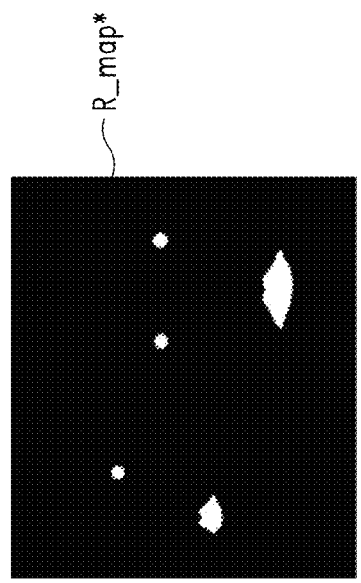
FIG. 8
FIG. 7

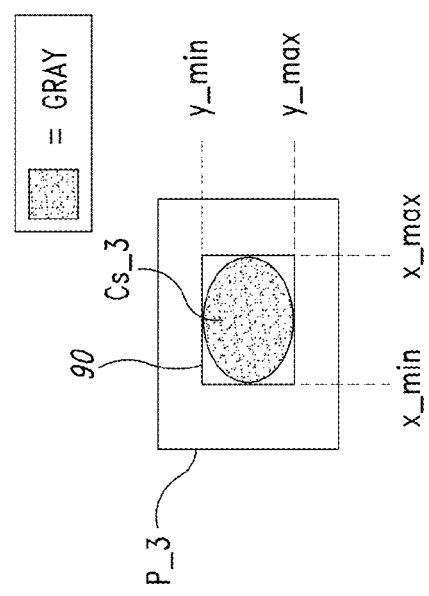
FIG. 14
FIG. 12
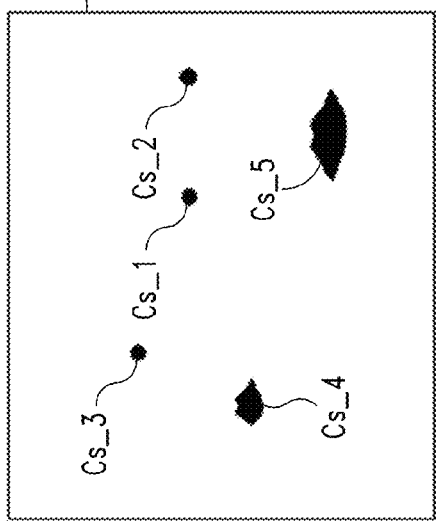
FIG. 17

FIG. 18

METHOD AND APPARATUS FOR FILTERING RED AND/OR GOLDEN EYE ARTIFACTS

BACKGROUND

1. Technical Field

The present description refers to the technical field of processing of digital images and in particular it refers to a processing method and apparatus for filtering a digital image aimed at removing red and/or golden eye artifacts from it.

2. Description of the Related Art

As known, the so-called red eye phenomenon consists of an artifact introduced into a photograph due to the reflection of the light of a flash by the retina of the eye of a person. This phenomenon happens following the occurrence of some conditions both in analog photography, i.e., traditional film photography, and in digital photography. The red eye phenomenon is generally more accentuated when the bulb provided to emit the flash light is close to the lens of the image acquisition device, as typically occurs, for example, in a compact digital camera.

In the state of the art numerous solutions have been proposed aimed at either reducing or eliminating the effects of the aforementioned phenomenon.

For example, it is now usual for digital cameras to foresee a flash production method in accordance with which the flash bulb of the cameras is controlled so as to emit a rapid series of pre-flashes before the final flash after which the actual image acquisition occurs. In practice, the rapid series of pre-flashes determines a contraction of the pupil and therefore in this way reduces the reflective area of an eye. Although the aforementioned expedient does not completely eliminate the effects of this phenomenon, it does nevertheless effectively attenuate it. However, the approach described above has the drawback of requiring high energy consumption, since the flash bulb is the component that consumes the most in a digital camera. Moreover, the successions of flashes can cause discomfort to the subject having their picture taken. Finally, the same subject can be incorrectly made to think that the series of pre-flashes is the flash associated with the actual image acquisition, and therefore they may move before the actual acquisition and thus alter the pose.

In the state of the art there are also different correction methods of digital images that operate in post-processing, i.e., after the digital image has been acquired. In such methods there is generally a step of detection of the presence of the artifact and a subsequent correction step, in particular filtering of the red and/or golden eye artifacts. Some of these methods, for example implemented in image processing programmes, are not completely automatic because they involve significant interaction from the operator. In order to overcome this serious limitation, numerous completely automatic methods have recently been developed. Some of these methods, like for example the one described in "Automatic red-eye Detection and Correction", by M. Gaubatz and R. Ulichney, Proc. of the IEEE Conf. Image Processing, pp. 804-807, NY 2002, use face and skin detection algorithms to identify possible areas of the images to correct. In these cases, the results are greatly influenced by the performance of the face and skin detection algorithms.

"Automatic Red-Eye Removal Based on Sclera and Skin Tone Detection", by F. Volken, J. Terrier, P. Vandewalle, CGIV 2006, Society for Imaging Science and Technology, p. 359-364, 2006 describes a correction/filtering method in which the identification of red eyes to be corrected is carried out by searching for suitable colors and suitable shapes within the image. This approach is based on the fact that the eye is characterised by its shape and by the white color of the sclera. By combining this intuitive approach with a good skin detection algorithm, the authors of the aforementioned article managed to obtain good results.

U.S. Pat. No. 6,407,777 describes a filtration method in which the detection of red eye to be corrected is carried out by preliminarily checking for the presence of some conditions during the image acquisition and subsequently carrying out geometric nature tests on the regions of the images put forward as candidates for correction. This method has the advantage of not requiring any skin or face detection procedure, but it seems to provide good results in ideal conditions in which the photo displays "exemplary" red eyes. Without intending to discredit this method in any way, we believe that its performance is, however, quite limited in real situations different to these described above, for example in cases in which the photo depicts a face not facing forwards with respect to the acquisition device.

Another type of artifact very similar to the one described above is represented by the golden eye artifact, which consists of an unnatural luminosity of some pixels corresponding to portions of an image that depict an eye. The techniques to avoid the production of such an artifact or to correct it are totally analogous to those described above with reference to the red eye artifact.

BRIEF SUMMARY

Efficient and reliable methods and systems for filtering red and/or golden eye artifacts are provided. The method may comprise selecting at least one patch of pixels of a digital image, the digital image comprising a plurality of pixels each comprising at least one digital value represented by a plurality of bits, the at least one patch comprising pixels potentially representative of at least one of: a red eye artifact and a golden eye artifact; classifying the at least one patch of pixels as "eye" or "non-eye"; and filtering said potentially representative pixels if the at least one patch of pixels is classified as "eye." The classification of "eye" is a classification for patches of pixels that represent an eye and the classification of "non-eye" is a classification for patches of pixels that do not include pixels that represent an eye. The classifying may comprise converting the at least one digital value of the at least one patch of pixels into a Gray Code representation resulting in a plurality of bit maps from the at least one patch of pixels wherein each bit map is associated with a respective bit of said Gray Code; and individually comparing said plurality of bit maps with corresponding bit map models belonging to a patch classifier, the patch classifier having been produced by a statistical analysis of bit maps previously obtained by converting, into a Gray Code representation, patches of pixels of digital images designated as containing or designated as not containing at least one of: a red eye artifact and a golden eye artifact. The apparatus may include a memory coupled to a processor configured to perform the above or may be a non-transitory computer readable medium having computer executable instructions thereon for performing the above.

BRIEF DESCRIPTION OF THE SEVERAL VIEWS OF THE DRAWINGS

Further characteristics and the advantages of the embodiments will be easier to understand from the following description of its preferred and not limiting example embodiments, in which:

FIG. 6 shows a binary color map obtained from the image of FIG. 5;

FIG. 7 shows the binary color map of FIG. 6 after it has been subjected to a closing operation;

FIG. 8 shows two examples of kernels able to be used in the closing operation;

FIG. 12 schematically shows a cluster map obtained from the image of FIG. 5;

FIG. 14 shows an example of conversion from binary to Gray Code;

FIG. 17 schematically shows a cluster of the digital image;

FIG. 18 shows an example of a correction mask; and

DETAILED DESCRIPTION

Figure 1:
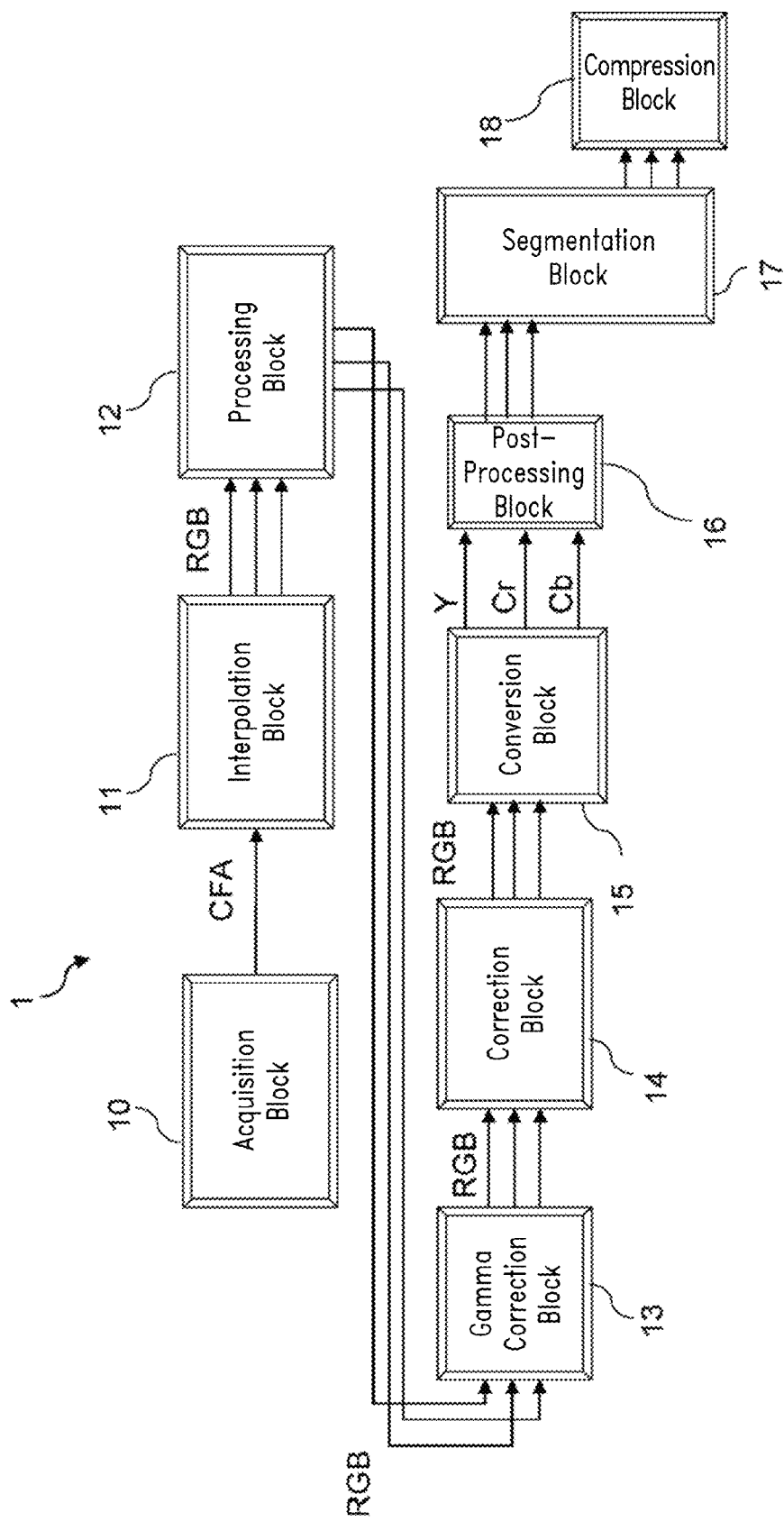
FIG. 1 shows a functional block diagram of a possible configuration of apparatus for processing digital images, in which a correction block is foreseen that is suitable for implementing a processing method aimed at filtering red and/or golden eye artifacts in a digital image.

FIG. 1 shows the block diagram of an exemplary configuration of a processing apparatus 1 of digital images suitable for implementing a method for correcting red and/or golden eye artifacts.

In accordance with an embodiment, the processing apparatus 1 comprises an acquisition block 10. For example, the acquisition block 10 comprises an optical sensor, like for example a CCD, an exposure control block and a flash, not shown in the figures. The acquisition block 10 is such as to provide in output a digital image in CFA format (Color Filter Array) from a real scene.

The processing apparatus 1 also comprises an interpolation block 11, suitable for receiving in input the digital image in CFA format to execute a processing, or rather interpolation, step in order to provide in output a digital image in Red-Green-Blue (RGB) format.

The processing apparatus 1 also comprises, connected together in cascade and in output from the interpolation block 11, a color processing block 12, suitable for executing a color correction step of the RGB image (such a correction is known in the field by the name Color Matrix), a gamma correction block 13.

In an alternative embodiment, the processing apparatus 1 could be an apparatus, like for example a common personal computer into the memory of which an information technology product is loaded, suitable for receiving the digital image to be processed from a memory, like for example a RAM or a Flash memory, or from a telecommunications network, at any stage of the processing stage that goes from blocks 10 to 13, since they have been introduced into the particular processing apparatus 1 described as an example.

The processing apparatus 1 also advantageously comprises a correction block 14 intended to correct red eye and/or golden eye artifacts. Such a correction block 14 is such as to actuate a processing method that will be described in greater detail hereafter.

The processing apparatus 1 also comprises a conversion block 15 for converting from RGB format to YCrCb format. In practice, the conversion block 15 is suitable for receiving in input the digital image in RGB format, as provided in output from the correction block 14, to provide in output a digital image in YCrCb format, in which Y indicates the luminance plane and Cr, Cb indicate the chrominance planes.

As shown in FIG. 1, in accordance with an embodiment the processing apparatus 1 also comprises, connected in output from the conversion block 15, a post-processing block 16 for post-processing the YCrCb image for example for enhancing the outlines and/or for the correction of color artifacts and/or of purple outlines.

Finally, in accordance with a possible embodiment, the processing apparatus 1 comprises a segmentation block 17 for segmenting the digital image as processed in Y, Cr, Cb format, and an MCU (Minimum Compression Unit) and a compression (or entropic coding) block 18. For example, the compression block 18 is a JPEG encoding/compression block.

Figure 2:
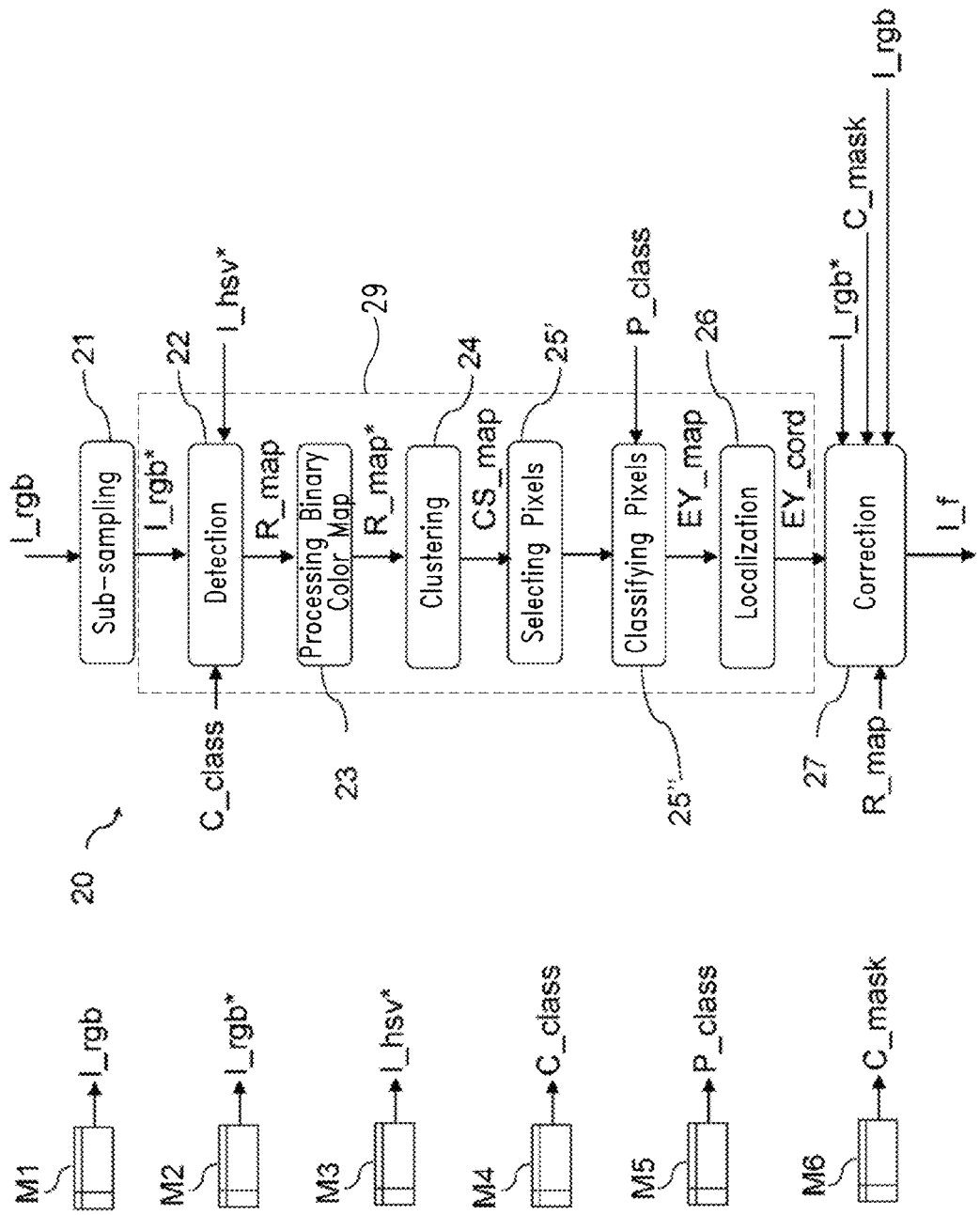
FIG. 2 shows an example flow diagram of the processing method able to be implemented by the correction block according to FIG. 1.

FIG. 2 shows a flow diagram relative to an embodiment of a processing method 20 adapted to be actuated by the correction block 14 to filter red and/or golden eye artifacts.

Henceforth, for the sake of simplicity and greater clarity, and without for this reason introducing any limitation, we shall refer to a processing method 20 intended to filter just red eye artifacts. The teachings of the present description can nevertheless be extended without difficulties by one skilled in the art with minimal adaptations to a processing method intended for filtering golden eye artifacts or to a processing method intended for filtering both red eye artifacts and golden eye artifacts.

In accordance with an embodiment, the processing method 20 comprises a sub-sampling step 21 suitable for producing a sub-sampled image I_rgb* in RGB format having a relatively low resolution from an initial image I_rgb in RGB format having relatively high resolution (for example equal to 5 Megapixels or 8 megapixels, etc.). For example, the initial image I_rgb is the digital image as provided in output from the gamma correction block 13 (FIG. 1). In FIG. 2 M1 is used to indicate a memory foreseen in the apparatus 1 of FIG. 1 for storing the initial image I_rgb and M2 is used to indicate a memory foreseen in the apparatus of FIG. 1 for storing the sub-sampled image I_rgb*. In accordance with an embodiment, the sub-sampling step 21 is such as to sub-sample the initial image I_rgb so as to produce a sub-sampled image having a preset size (for example, equal to 1 Megapixel or 2 Megapixels, etc.).

In accordance with an embodiment, the sub-sampling is carried out through a bilinear process in order to reach the desired size.

In accordance with an alternative embodiment, in the processing method 20 there is no sub-sampling step 21, since it can be foreseen for the processing method 20 to receive an image I_rgb* with relatively low resolution directly in input, for example receiving in input the image used to carry out the preview on the viewfinder of a digital camera or of any digital image acquisition device.

Irrespective of the origin of the image I_rgb* it is preferable, but not necessary, for the steps that will be illustrated hereafter of the processing method 20 to operate from an RGB image with relatively low resolution.

The processing method 20 comprises a step 22 of color detection, suitable for receiving the digital image I_rgb* to provide in output a binary color map R_map having a number of pixels corresponding to the number of pixels of the image I_rgb* and in which each pixel, based on the color of the corresponding pixel of the image I_rgb*, is marked in a binary way as "potential red eye artifact" or as "surrounding". For the purposes of the present description by "surrounding" we mean everything that cannot be classified as potentially representative of a red eye artifact.

In accordance with an embodiment, the color detection step 22 comprises an operation of transforming the image I_rgb* into an ad hoc representation in a multi-dimensional space, said transformation being carried out based on a technique like PCA (Principal Component Analysis). The PCA technique makes it possible to obtain, from starting data sets represented over multi-dimensional spaces, the components of which are correlated with one another, a representation of said data sets in multi-dimensional spaces having a small number of dimensions and the components of which are not correlated with one another, in order to be able to carry out analyses or predictions on such spaces with a small number of dimensions. Based on the particular field of application, the PCA technique is also known as discrete Karhunen-Loève transform, or Hotelling transform or proper orthogonal decomposition (POD).

In accordance with an embodiment, the aforementioned transformation operation is such as to produce from a representation I_rgb* of the digital image in RGB format and from a representation I_hsv* of said image in Hue, Saturation, Value (HSV) format, also called Hue-Saturation-Brightness (HSB) format, a representation in a three-dimensional space, in which the three components are independent, i.e., not correlated with one another. For example, the image I_hsv* in HSV format is taken from a suitable memory M3 inside which it has been stored after having carried out a conversion operation from the image I_rgb* in RGB format.

In accordance with an embodiment, the color detection step 22, after the aforementioned transformation operation, comprises an operation of classifying pixel by pixel the digital image I_rgb*, in practice producing the binary color map R_map, analysing the values of the pixels in the representation of the image obtained through the PCA transformation and comparing such pixels with a color classifier C_class obtained off-line and for example stored in memory M4 of the processing apparatus 1.

Figure 3:
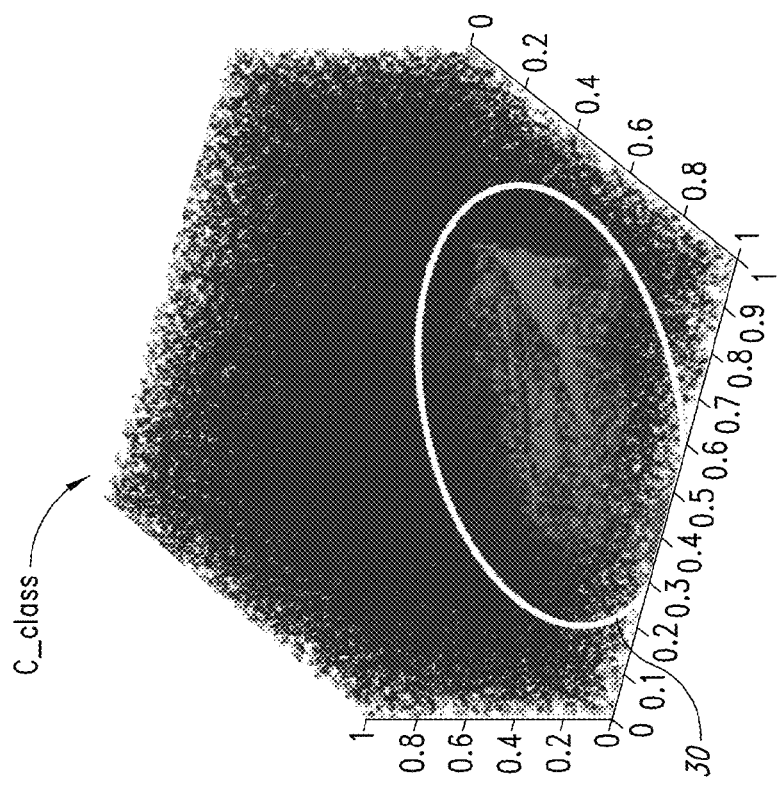
FIG. 3 shows an example of color classifier able to be used in the method of FIG. 2 to mark the pixels of the image as potentially representative of artifacts or as outlines.

The color classifier C_class is for example obtained off-line by analysing a large number of digital images transformed through the aforementioned PCA transform and by distinguishing amongst them pixels actually representative of a "red eye artifact" and pixels actually representative of a "surrounding". FIG. 3 shows, as an example, a color classifier C_class in a three-dimensional space obtained from a PCA transform taking into consideration a large number of images. In such a color classifier C_class the points marked with black color correspond to points in multi-dimensional space to be classified as "surrounding" whereas the points marked with gray color (i.e., those surrounded by the ellipse) correspond to points of multi-dimensional space to be classified as potentially representative of a red eye artifact.

Figure 4:
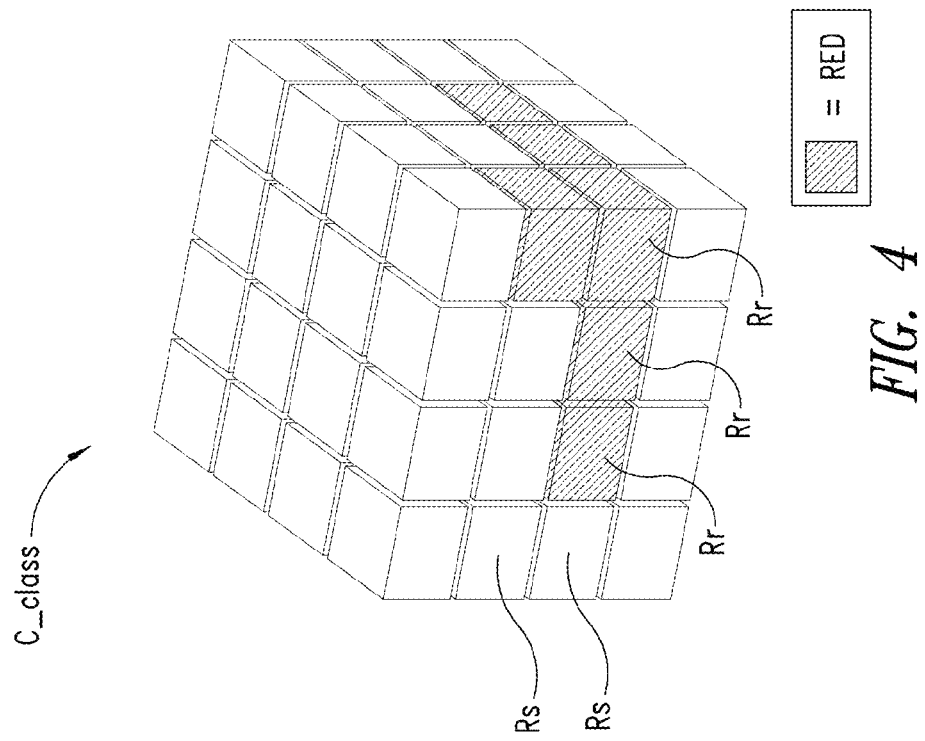
FIG. 4 shows the color classifier of FIG. 3 after it has been subjected to a quantization operation.

With reference to FIG. 4, in accordance with an embodiment in obtaining the color classifier C_class off-line there is an operation of quantising the color classifier C_class in a space of cubes of dimension YxYxY (in which for example Y=20) to obtain a quantised color classifier C_class*. Each cube of the space is labelled as "artifact" or as "surrounding" based on the classification of the points of space belonging to such a cube (in the example the points are the marks in FIG. 3). Such a quantised color classifier C_class* can optionally be subjected to a smoothing operation to reduce its fragmentation. In FIG. 4 the cubes Rs represent in the quantised color classifier C_class* regions of three-dimensional space with which the class "surrounding" is associated, whereas the cubes Rr represent regions of such space with which the class "artifact" is associated.

Figure 5:
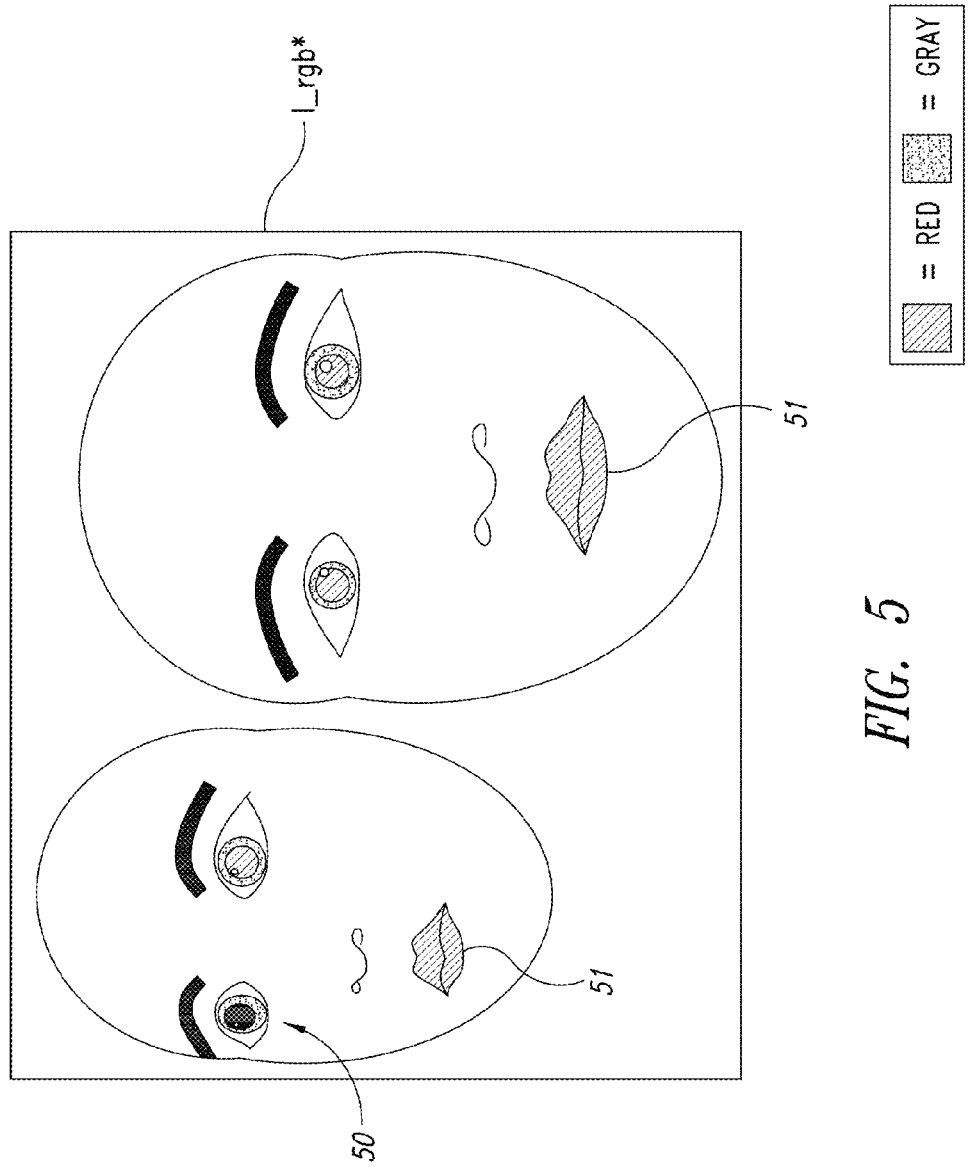
FIG. 5 schematically shows an example of a digital image to be corrected.

As already stated, the color detection step 22 makes it possible to obtain a binary color map R_map in which the pixels of the image are classified in a binary way as "surrounding" pixels or as pixels potentially representative of artifacts. With reference to FIGS. 5 and 6, it should be observed how from the starting image of FIG. 5 the color detection step 22 makes it possible to obtain the binary color map R_map of FIG. 6 (in which the pixels potentially representative of red eye artifacts are represented in white whereas the pixels representative of "surrounding" are represented in black). In the example it is hypothesised that the eye 50, for example thanks to its angulation with respect to the flash, is not affected by red eye artifacts. It can be observed how the color detection step 22 is such as to produce a binary color map R_map in which there is distinguishing between pixels potentially representative of red eye and pixels representative of outlines and not between pixels certainly representative of red eye and pixels representative of outlines. Indeed, it can be observed that pixels corresponding to the lips 51 have also been classified in the binary color map R_map as potentially representative of red eye artifacts. This can happen because, as known, the color of the lips can be confused with the typical color produced in an image by the red eye phenomenon and the color classifier C_class, being a classifier based on the color, is not always able to make a correct distinction.

Going back to FIG. 2, in accordance with an embodiment the processing method 20 comprises a subsequent step 23 of processing the binary color map R_map in order to obtain a more homogeneous map, removing small agglomerations of pixels that are dishomogeneous with respect to a surrounding or proximal region and connecting agglomerations of pixels that are homogeneous and close to one another. For example, in the processing step 23 there is a morphological closing operation of the binary color map R_map. The morphological closing operation in practice is in the form of a dilation process, carried out using a given kernel, followed by a subsequent erosion process, carried out using the same aforementioned kernel. In accordance with an embodiment it is possible to use different kernels according to the resolution of the low resolution image I_rgb*. For example, if such a resolution is less than or equal to 1 Megapixel it is possible to use a 3×3 kernel like for example the kernel 80 represented in FIG. 8, and otherwise if the resolution is higher it is possible to use a 5×5 kernel like the kernel 81 represented in FIG. 8.

As can be observed with reference to FIG. 7, the binary color map R_map* obtained through the aforementioned closing operation from the binary color map R_map has more homogeneous regions with respect to the latter.

With reference to FIG. 2, in accordance with an embodiment the processing method 20 comprises a subsequent clustering step 24, i.e., identifying so-called "clusters", in other words groups, of pixels potentially representative of red eye artifacts within the binary color map R_map.

Figure 9:
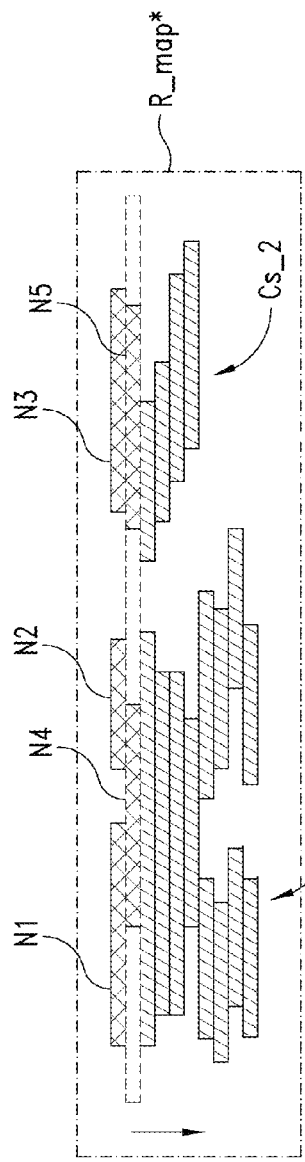
FIGS. 9, 10 and 11 show an example of a binary color map to be subjected to a clustering operation.
Figure 10:
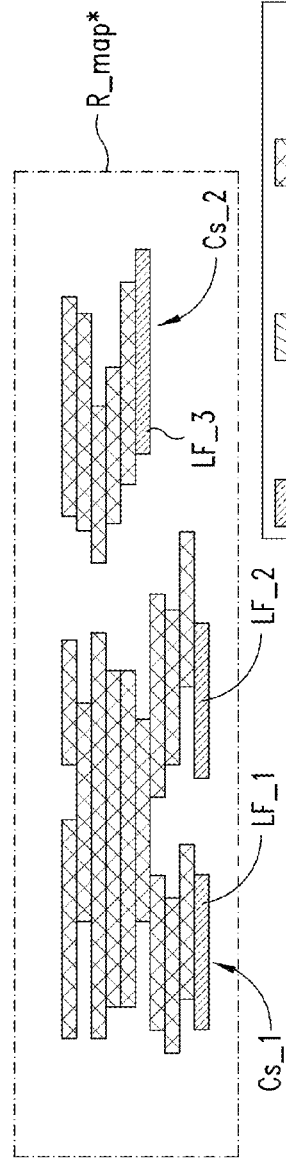
Figure 11:
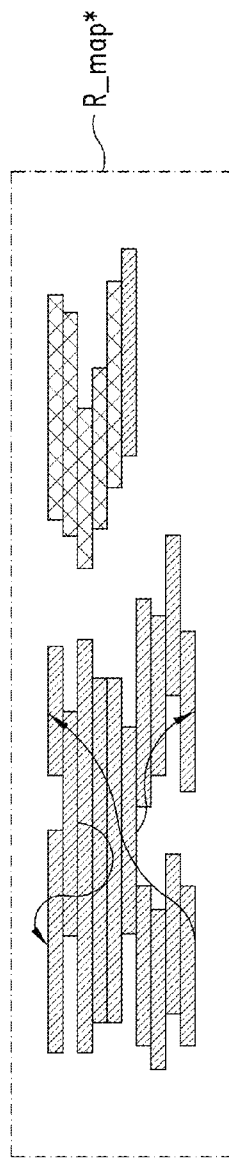

With reference to FIGS. 9, 10, 11, the clustering step 24 comprises an operation of line-scanning the binary color map R_map* to identify distinct segments of pixels comprising pixels classified as potentially representative of red eye artifacts. With reference to FIG. 9, through horizontal scanning from left to right of the first line of the binary color map R_map* the segments N1, N2, N3 are identified. By scanning the subsequent line, the segments N4, N5 are identified.

At the same time as the scanning operation there is a graph formation operation, in which the segments N1, . . . , N5 identified one after the other in the scanning are stored as nodes of said graphs. For each new segment identified, not adjacent to previous already identified segments, a new graph is in practice created. For example, with reference to FIG. 9 by starting the scanning of the binary color map from the first line the segment N1 is identified and a first graph is allocated and the segment N1 is stored as a node of said graph. By continuing the scanning of the map the segment N2 is identified and a second graph is allocated and the segment N2 is stored as a node of said second graph. By continuing the scanning of the map the segment N3 is identified and a third graph is allocated and the segment N3 is stored as a node of said third graph.

By scanning the subsequent line the segment N4 is identified, but it is detected that such a segment is adjacent to the nodes N1 and N2, for which reason no new graph is allocated but the new segment is stored as a second node of the first and of the second graph.

The scanning proceeds and new segments are identified, new graphs are possibly allocated and possible detected spatial adjacency is stored. It can be observed that, advantageously, to detect possible adjacency with previously identified segments it is sufficient to keep two lines of the binary color map R_map* is memory at a time, i.e., the one being scanned and the one previously scanned, and to inspect, for each pixel being scanned, a horizontal window of 3 pixels centred on said pixel.

Once the scanning of the binary color map is complete, the set of graphs is inspected to identify connected components. In order to store the graphs only the leaf nodes, i.e., in the example the nodes LF_1, LF_2 and LF_3, are stored in a vector. Each graph represents a connected component in the binary color map, and therefore by processing each graph the list of clusters of pixels potentially representative of a red eye artifact is obtained. In accordance with an embodiment, the graphs are visited through a DFS search operation, i.e., Depth First Search (FIG. 11) and the memory is feed through a new DFS search. With reference to FIG. 12, a list of clusters Cs_1, . . . , Cs_5 representative of a cluster map Cs_map, comprising clusters of pixels potentially representative of red eye artifacts, is therefore obtained.

With reference to FIG. 2, the processing method 20 comprises a subsequent step 25' of selecting for each cluster a corresponding patch of pixels in the digital image I_rgb*. In FIG. 2 such step is indicated as pixels selection step 25'.

Figure 13:
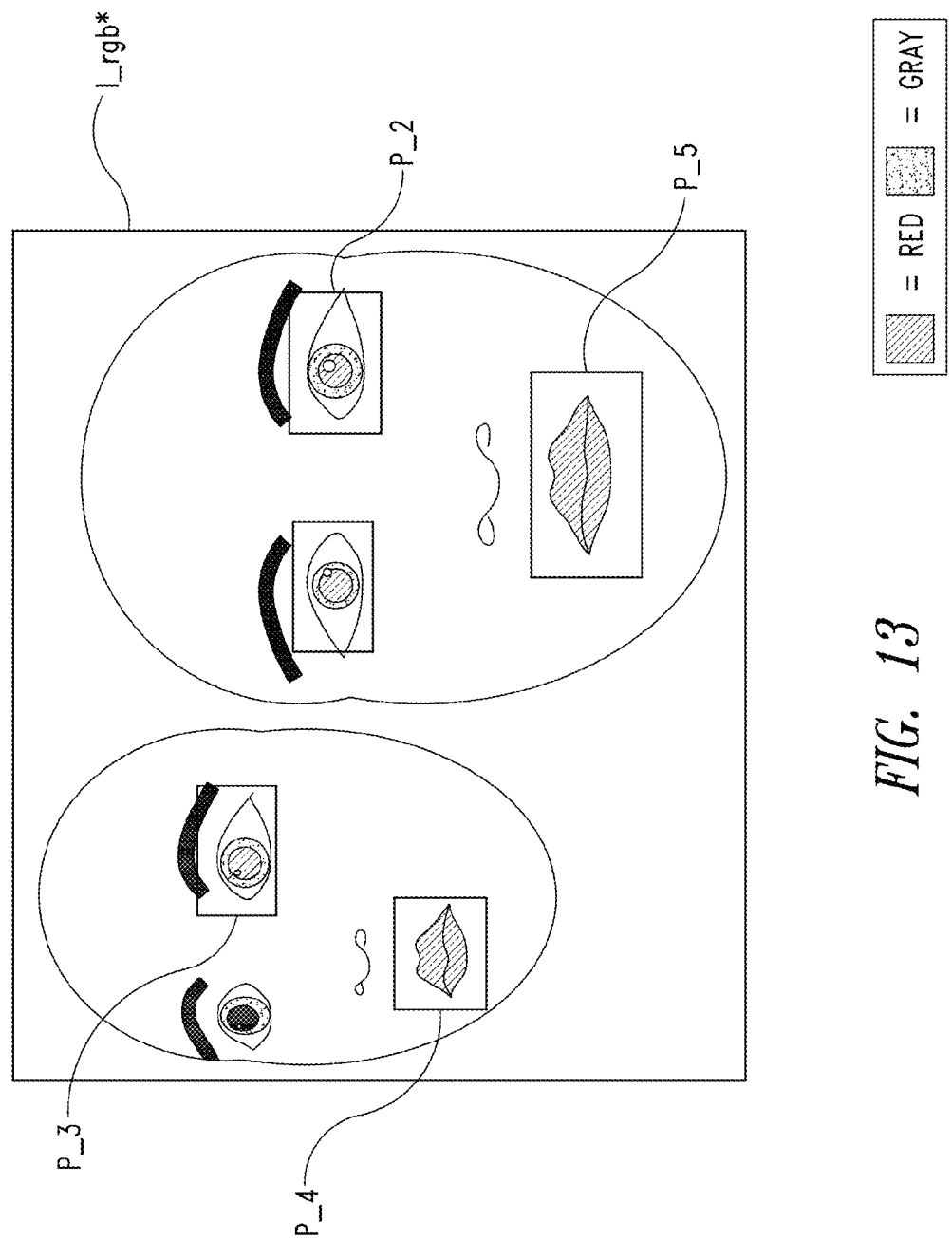
FIG. 13 shows the image of FIG. 5 with some regions to be cut out highlighted.

With reference to FIG. 13, in accordance with an embodiment the step of selecting the patches of pixels is such as to select in the image I_rgb to be corrected (or rather from its sub-sampled version I_rgb*) for each cluster in the map Cs_map a region that spatially surrounds pixels of said image in positions corresponding to the clusters Cs_1, . . . , Cs_5. For example, such patches of pixels are quadrangular shaped regions having approximately one dimension equal to four or five times the dimension of a cluster, which means in the case in which the cluster is actually representative of a red eye artifact that the patch of pixels corresponds to a portion of image that comprises a complete eye with lids, sclera, iris and lashes. In accordance with an embodiment the selected pixel patches are resampled to a predetermined fixed dimension N×N (for example equal to 30 pixels×30 pixels).

With reference to FIG. 2, the processing method 20 comprises a step 25" of classifying the patches of pixels selected in the previous pixels selection step 25'.

In accordance with an embodiment, the classification step 25" of the patches of pixels comprises:
  an operation of converting the digital values of each patch of pixels into a representation in Gray Code, obtaining overall from each patch of pixels a plurality of corresponding bit maps (or binary patches), each associated with a respective bit of said Gray Code, each bit map comprising for each pixel of said patch of pixels at least one spatially corresponding respective bit (based on the number of digital values associated with the pixel, for example three bits for each pixel if the patches of pixels are in R, G, B format);
  an operation of individually comparing said bit maps with corresponding models of bit maps, or bit maps models, belonging to a patch classifier P_class obtained off-line through a statistical analysis of patches of digital images converted into Gray Code, and of corresponding bit maps obtained from said conversion into Gray Code, containing or not containing red eye artifacts. With reference to FIG. 2 the patch classifier P_class is, for example, stored in a memory M5.

As indicated above, the digital values R, G, B of the pixels belonging to the patches of pixels are in practice converted into a Gray Code. As known, a Gray Code is a representation of $2^n$ binary number in which there is a change of a single bit between two consecutive symbols. FIG. 14 shows merely as an example a conversion table from a binary representation of digital values on three bits to a representation in Gray Code.

Figure 15:
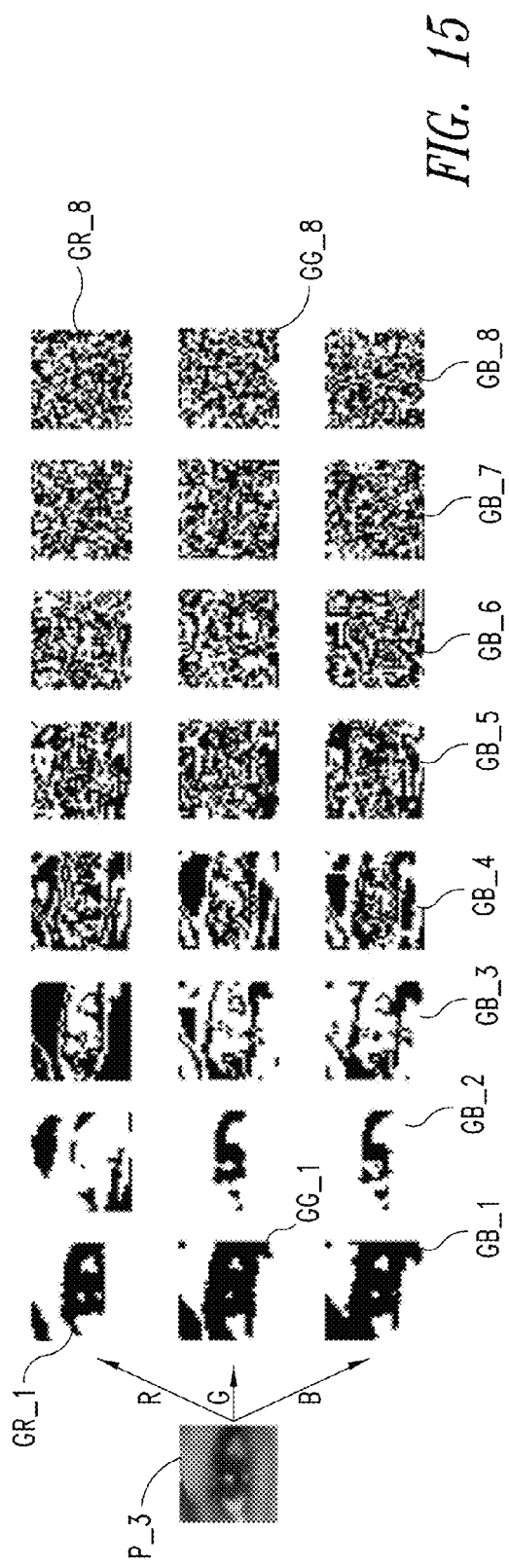
FIG. 15 shows a patch of image pixels before and after the conversion in a Gray Code representation, with the decomposition of the patch of pixels in a plurality of bit maps.

In this way, as represented merely as an example in FIG. 15, in the hypothetical case in which the digital values R, G, B of a patch of pixels P_3 are represented on eight bits per channel, such a patch of pixels P_3 in RGB format is transformed into a representation in new space with 24 bit maps. In FIG. 15 GR_1 indicates the bit map corresponding to the most significant bit (MSB) of the symbols of the Gray Code relative to the plane R, GG_1 indicates the bit map corresponding to the most significant bit (MSB) of the symbols of the Gray Code relative to the plane G, GB_1 indicates the bit map corresponding to the most significant bit (MSB) of the symbols of the Gray Code relative to the plane B. Similarly, GR_8 indicates the bit map corresponding to the least significant bit (LSB) of the symbols of the Gray Code relative to the plane R, GG_8 indicates the bit map corresponding to the least significant bit (LSB) of the symbols of the Gray Code relative to the plane G, GB_8 indicates the bit map corresponding to the least significant bit (LSB) of the symbols of the Gray Code relative to the plane B.

In the subsequent comparing operation, the bit maps GR_1, . . . , GR_8, GG_1, . . . , GG_8, GB_1, . . . , GB_8 obtained from the conversion in Gray Code of the patch of pixels in RGB format are compared with corresponding model bit maps MR_1, . . . , MR_8, MG_1, . . . , MG_8, MB_1, . . . , MB_8 of the aforementioned patch classifier P_class obtained off-line through an automatic learning algorithm taking into consideration a large number of patches, or "training patches", of digital images relative to real scenes containing eyes or not. In accordance with an embodiment, such an algorithm is based on a boosting technique. Boosting is a known procedure for combining the performances of weak classifiers in order to achieve a better classifier. A particular example of such a technique is described in "The strength of weak learnability", by Robert E. Shapire, Machine Learning, 1990, pp. 197-227.

Figure 16:
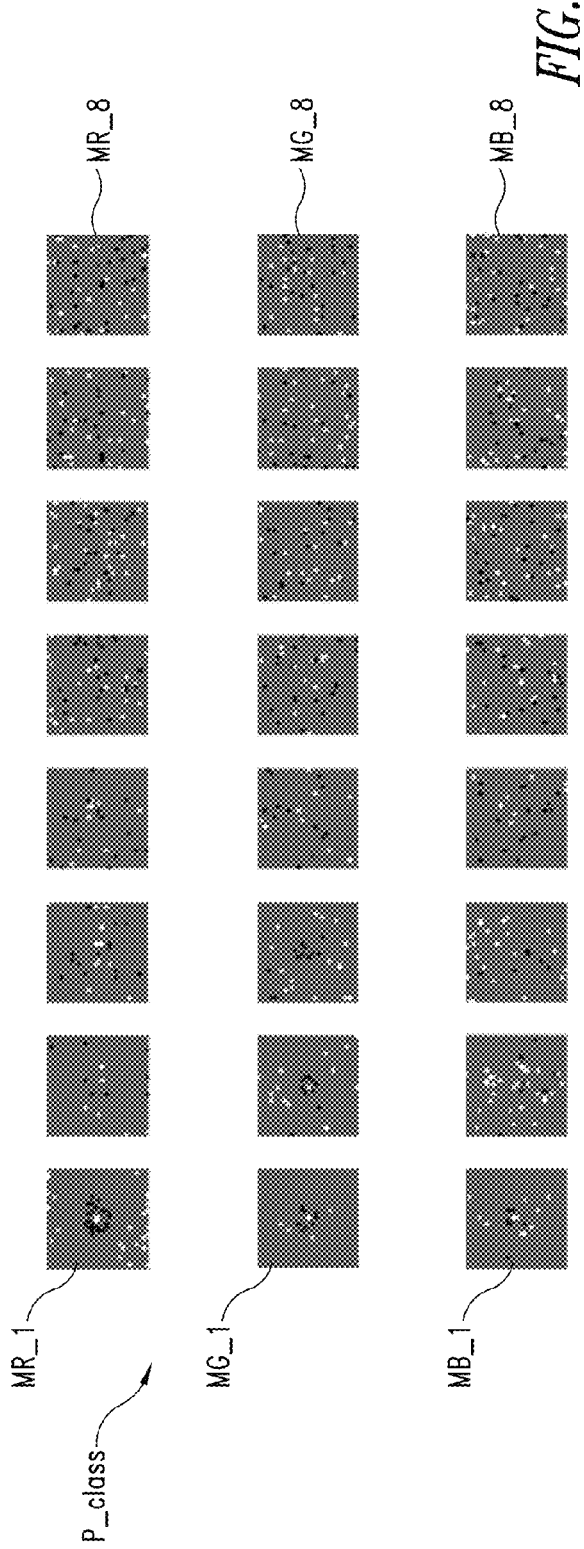
FIG. 16 shows a patch classifier.

In accordance with a currently preferred embodiment, the aforementioned algorithm uses a so-called Gentleboost technique. A particular example of such a technique is described in "Additive Logistic Regression: a Statistical View of Boosting", by Jerome Friedman et al., Annals of Statistics, 2000, vol 8, p. 2000. Based on what is outlined above, it can be observed how the ratio forming the basis of the classification carried out in the classification step 25" is the following. In the Gray Code space only a subset of all of the possible combinations of bits of a bit map correspond to bit maps obtained from patches of pixels containing eyes and it is wished to select in the bit maps those bits that statistically differ in terms of binary value between bit maps relative to patches of pixels containing eyes and bit maps relative to patches of pixels not containing eyes. The comparison is then actually carried out exclusively on such bits, for which reason it is sufficient to compare a selected and relatively small number of bits of the bit maps. With reference to the example classifier of FIG. 16, the comparison is in this specific case only carried out on the bits, which we will call relevant bits, that in such a figure are arranged at the points represented through the colors black and white, whereas the bits arranged at the gray colored points are not taken into consideration, accordingly for the purpose of the classification such gray colored points are "don't care" bits. In the example represented the bit maps according to FIG. 15 each have a size equal to 30 bits×30 bits and the total number of bits corresponding to the white or black points of the map of the patch classifier P_class, i.e. the total number of relevant bits, are roughly equal to eight hundred. This means that the average number of relevant bits for each bit map which have to be taken into account in the comparison with a corresponding bit map model of the patch classifier P_class is about thirty-three, which is a small number with respect to the total number of bits, in this example nine hundreds, of each bit map.

For example, with reference to the bit map GR_1 the comparison step is such as to verify that:
- bits of the bit map GR_1 in positions corresponding to the black points (for example the binary value "0" is associated with black) in the model bit map MR_1 are black (i.e., they have value "0"), and that
- bits of the bit map GR_1 in positions corresponding to the white points (for example the binary value "1" is associated with white) in the model bit map MR_1 are white (i.e., in this example, they have value "1").

By making the aforementioned comparisons between all of the bit maps in the representation in Gray Code of the patch of RGB pixels with corresponding model bit maps of the classifier P_class it is possible, for example, to increase a counter Count, i.e. add a score, every time a match is found and decrease it, i.e. subtract a score, every time a mismatch is found.

At this point in the classifying step 25" it is possible to determine that the patch of pixels refers to an eye if:

$$Count > Ey\_th$$

in which Ey_th is a predetermined threshold that can, for example, be equal to 0 (clearly, increasing such a threshold in this example increases the margin of reliability of the classification because it increases the border of separation between the possible "eye" and "non-eye" classes).

The approach described above, which uses a classification based on a binary representation in a Gray Code rather than based on a conventional representation, makes it possible to reduce the impact of small variations in the patches of pixels that could produce significant variations in the binary code.

In accordance with a further embodiment, it is possible to foresee that in the classification step 25" many distinct sub-classifiers be taken into consideration, each associated with a respective morphology or orientation or type or "mode" of eye, possibly reducing the number of points to be tested for each sub-classifier so as not to excessively increase the computational load. Accordingly, in such an embodiment the patch classifier P_class includes a plurality of patch sub-classifiers. For example, it would possible to provide a plurality of patch sub-classifiers each associated to a corresponding distinct "kind", i.e. "group" or "mode" or "category", of eyes: such as for example a first sub-classifier concerning "left eyes", a further sub-classifier concerning "right eyes", further sub-classifiers concerning eyes (right or left) "looking upward" or "looking downward", further sub-classifiers concerning "fully open eyes" or "partially closed eyes", etc.

In the above described embodiment of "multimodal" classifier, i.e. a patch classifier made up of a plurality of patch sub-classifiers each associated to a corresponding "mode" of eye, a patch is classified in the classification step 25" as being an "eye" if, for example, for at least one sub-classifier P_class of said plurality the above counter Count is greater than threshold Ey_th. Such threshold Ey_th can be specific for each one of the sub-classifiers or in common to all the sub-classifiers. According to an embodiment, if there is more than one sub-classifier for which the counter Count is greater than threshold Ey_th, the patch is classified as being representative of an eye of the mode of the sub-classifier corresponding to the highest value of the counter P_Count, i.e. the counter which has received the highest number of "scores".

According to a further embodiment it is possible, both in the case of a classifier comprising only one classifier and in the case of a multimodal classifier, to perform the classification step 25" in such a way that during the classification step 25", the classifier's data, both in a stored "original" version and in a "rotated" version of the same, for example a version rotated by 90°, are taken into account, in order to correctly classify patches when the digital image to be corrected is in "portrait mode". The rotated version of the classifier's data can be easily obtained by the stored original version by swapping the bit coordinates of the relevant bits of the model bitmaps. While it is convenient to perform the above mentioned 90° rotation for classifying patches of images in "portrait mode", it is convenient to provide in the off-line building of the classifier P_class learning patches also in versions rotated by +45° and −45° in order to correctly classify patches of digital images to be corrected which are in "landscape mode".

In accordance with an embodiment, the classification carried out in step 25" can optionally be strengthened with one or more geometric controls. In particular, in the case in which in accordance with the classification outlined above carried out through the classifier P_class it has been established that a given patch of pixels corresponds to an eye, it is possible to take geometric measurements on the "red" pixels of the patch (or rather of the red pixels of the patch of pixels that belong to the cluster from which the patch of pixels has been obtained). With reference to FIG. 17, some examples of geometric measurements are:
- area of the cluster Cs_3;
- filling (i.e., a measurement of the amount of pixels of the cluster with respect to a selected area 90, for example quadrangular, that quite tightly encloses the cluster Cs_3);

circularity of the cluster Cs_3;
elliptical ratio of the cluster Cs_3;
distortion of the cluster Cs_3.

According to a further embodiment, in the classification step 25" it is possible to additionally take into account spatial information between/among bits within a same at least one bit map obtained from the patches, (just to make a practical example an d without introducing any limitation: the Grey code bit map concerning the MSB of the Red channel R), by:

selecting at least a set of bits (preferably at least one couple of bits) in given positions in such bit map;

performing an XOR operation (preferably applying the Boolean XOR function), or in general an operation of evaluating a correlation function, between/among the bit values of the bits within the same selected at least one set of bits for obtaining at least a resulting XOR value, or in general a resulting correlation value; and comparing the at least resulting XOR or correlation value with a corresponding at least one "expected value", obtained performing the same XOR or correlation operation between/among bit values of spatially corresponding bits of a corresponding model bit map of the classifier P_Class. The above additional XOR or spatial correlation check can be performed on one or more of the bit maps defining the Grey code representation of the patches.

In the present description we will refer to the above improvement as the "additional spatial correlation check operation".

Advantageously, the number of sets and the positions of the starting bits selected for producing the XOR or correlation resulting values which are most useful for discriminating between "eye" and "not-eye" are for each of the involved bit maps automatically learned off-line, when building the classifier P_class, because this is possible according to the boosting learning techniques. Accordingly, in the classification step 25", the sets of bits in each of the bit maps to take into account in the additional spatial correlation check operation can be considered as known and fixed data of the patch classifier P_class.

Coming back to FIG. 2, it is therefore clear that at the end of the classification step 25" of the patches of pixels a map EY_map of the clusters containing the pixels to be corrected is obtained.

In the processing method 20, there is a subsequent localisation step 26, intended to extract the coordinates EY_cord of the clusters containing the pixels to be corrected (for example with reference to FIG. 17 such coordinates can be x_min, x_max, y_min, y_max).

With reference to FIG. 2 the processing method 20 comprises a subsequent correction step 27 that from the coordinates extracted in the previous step 26, from the cluster map CS_map, from the binary color map of the pixels "potentially representative of a red eye artifact" and from a correction mask C_mask (the latter is for example stored in a memory M6 of the processing apparatus 1) carries out the correction on the high resolution image I_rgb to obtain a corrected image I_f.

In accordance with an embodiment, the correction is in the form of a reduction of the luminosity and of the saturation of the region of the pupil and reference is made to the cluster because this is used to establish the area that is to be subjected to correction. In order to avoid producing an ugly transition from the iris to the pupil, the cluster is replaced by a mask of equal dimensions in which for each value a weighted luminosity-saturation reduction value is used.

Preferably, only pixels corresponding to pixels marked in the binary color map R_map as potentially indicative of a red eye artifact are corrected so as to avoid eliminating glints from the image.

Figure 18:
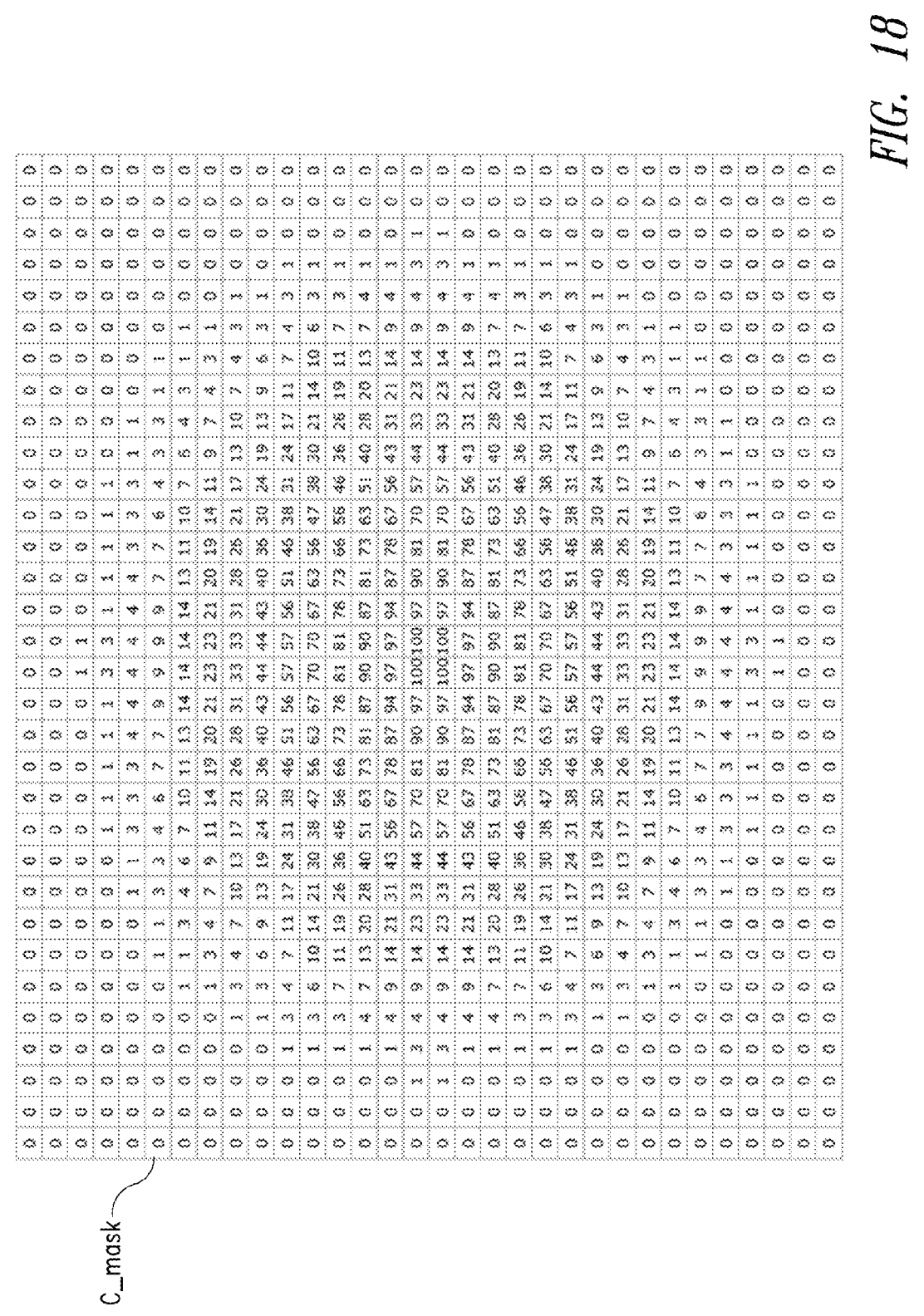

In accordance with an embodiment, with reference to FIG. 18 the correction mask C_mask based on a fixed point lookup table (LUT) of dimensions 32×32. Such a mask is preferably resized through a bilinear resampling according to the size of the cluster.

With reference to FIG. 2, according to a further embodiment, in the case in which the processing method 20 is adapted to correct both red-eye and golden-eye artifacts, it is possible to provide two processing macro modules 29 in parallel, for detecting red-eye and golden-eye artifacts respectively as above already explained for steps from 22 to 26. In this embodiment, the correction step 27 may conveniently include an overlapping detection step, in order to prevent a double correction on at least partially overlapping regions of the digital image I_rgb*, due to the fact that such regions correspond to a patch classified as red/golden eye artifact by the macro modules 29. The overlapping detection step can be performed by comparing the boundaries of the regions, and is such regions have an overlapping percentage exceeding a preset threshold, the correction step may be performed only on one region, i.e. to the region corresponding to the patch classified as red eye artifact or to the region corresponding to the patch classified as golden eye artifact, preferably on the region corresponding to the patch classified as red eye artifact.

Figure 19:
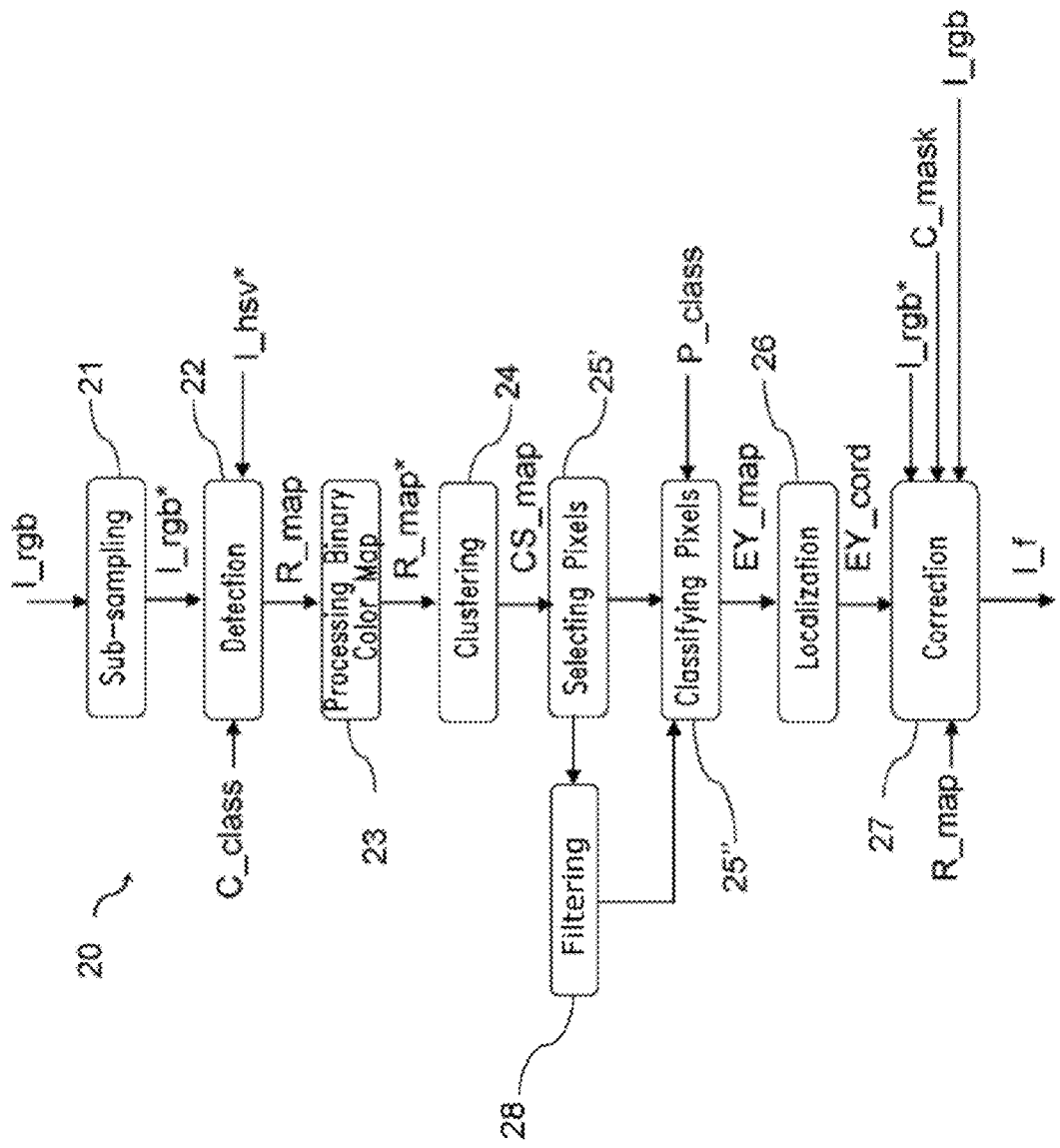
FIG. 19 shows a flow diagram of a variant embodiment of the processing method of FIG. 2.

In FIG. 19, a variant embodiment of the processing method of FIG. 20 is shown. The embodiment of FIG. 19 differs from the above embodiments disclosed with reference to FIG. 2 because it includes a filtering step 28 of the patches selected in the selecting step 25'. The filtering step 28 is comprised between the selecting step 25' and the classification step 25". Therefore, in the embodiment of FIG. 19 the classification step 25" is performed both on the R, G, B patches and on filtered patches, i.e. patches obtained from the RGB patches according to one ore more filtering operations performed in parallel in the filtering step 28. In this way, an additional set of Gray Code bit maps obtained from the one or more filtered patches obtained from corresponding RGB patches is taken into consideration in the classification step 25", in order to further improve the performances and the reliability of the processing method 20. The above filtering operations can include one or more of the following filters arranged in parallel:

Luminance;
Diagonal gradient;
Horizontal gradient;
Vertical gradient.

The above filters can be simple Prewitt filters.
Further examples of filters that can be used in the filtering step 28 are:

Gaussian Logarithm (LoG);
Gaussian.

For each input RGB patch each of the above filtering operations, or "filters", can provide one or more filtered patches as additional patches that can be taken into account in the subsequent classification step 25". According to a further embodiment, it is also possible that such filtered patches are the only patches to be taken into account in the classification step 25", accordingly the R, G, B patches aren't strictly needed patches to be feed as input to the classification step 25".

According to a further embodiment, it is possible to apply the above described additional spatial correlation check of the classification step 25" mutatis mutandis also to one or more of the Gray Code bit maps obtained from the above described one or more filtered patches.

With continued reference to FIG. 19, in the case in which the processing method 20 is provided for the correction of golden eyes, according to a further embodiment the above mentioned filtering step 28 includes also a filtering operation adapted to produce starting from the input patches corresponding "special signatures" of the patches, in the form of bit strings, by using an algorithm belonging to an image processing technique known as "scale space histogram". Advantageously, such embodiment, by providing corresponding model special signatures in the off-line building of the classifier P_class, is adapted to reduce possible false positives obtained when eye's sclera is interpreted as golden artifact. Such false positives, if not detected, would bring to a very irritating not required correction of the digital image.

As can be appreciated from what has been described above and as confirmed by experimental results, a processing method of the type described above allows the preset purposes to be fully accomplished. In particular the obtained results pointed out good trade-off between overall hit-rate and false positives. In particular, concerning the embodiment comprising the filtering step 28 and the additional spatial correlation check, the above results pointed out an hit rate of 83.41%, in particular 875 red/golden eyes have been correctly detected with respect to the 1049 red/golden eyes of 390 input images whereas only 34 false positives have been introduced.

Moreover the above results shown also good performances in terms of quality measure, for example evaluated according the teachings of the paper "Automatic red eye correction and its quality metric", by Safanof et Al., in Proceedings of SPIE electronic Imaging, 2008.

One skilled in the art, in order to satisfy contingent and specific preferences, can bring numerous modifications and variants to the processing method described above.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    filtering an eye color artifact from a digital image that includes a plurality of pixels each having a digital value, the filtering including:
        determining that a patch of pixels of the digital image includes pixels potentially representative of the eye color artifact;
        classifying the patch of pixels as "eye" or "non-eye" based on whether the patch is determined as representing an eye; and
        filtering said pixels potentially representative of the eye color artifact if said patch of pixels is classified as "eye";
    wherein the classifying comprises:
        converting the digital values of said patch of pixels into a Gray Code representation that includes a plurality of bits,
        obtaining a plurality of bit maps from said patch of pixels, each bit map being associated with a respective bit of the plurality of bits said Gray Code, and individually comparing said bit maps with corresponding bit map models.

2. The method of claim 1 wherein the comparing is performed using a respective selected and limited sub-set of bits for each bit map of said plurality of bit maps.

3. The method of claim 1 further comprising producing the patch classifier before the comparing, the producing including using an automatic learning algorithm based on a boosting technique.

4. The method of claim 1 wherein the digital image is an image in RGB format and wherein each pixel of the digital image comprises three digital values, R, G and B respectively, and wherein the classifying, converting, comparing and filtering is applied to each of said three digital values of each of the plurality of pixels of the patch of pixels.

5. The method of claim 1, further comprising detecting color of the digital image, the detecting including performing a Principal Component Analysis-type transformation of the digital image into an ad hoc representation in a multidimensional color space.

6. The method of claim 5 wherein the detecting comprises performing the Principal Component Analysis-type transformation starting from representations of said digital image in two distinct linear color spaces to obtain a representation of the digital image in a single three-dimensional space with independent components.

7. The method of claim 6 wherein said distinct linear color spaces are RGB space and HSV space.

8. The method of claim 5 further comprising:
    producing from said ad hoc representation a binary pixel color map;
    marking the pixels of said ad hoc representation as potentially representative of an artifact or as representative of an outline; and
    clustering the marked pixels to identify in said binary pixel color map at least one cluster of marked pixels as potentially representative of at least one of: a red eye artifact and golden eye artifact.

9. The method of claim 8 wherein the clustering comprises scanning said binary pixel color map by lines to obtain one or more graphs of spatially connected pixel segments having a color indicative of an artifact.

10. The method of claim 1 wherein the comparing is performed using a respective selected and limited sub-set of bits for each bit map of said plurality of bit maps.

11. The method of claim 1 wherein the corresponding bit map models belong to a patch classifier, produced by a statistical analysis of bit maps obtained by converting patches of pixels of digital images containing or not eye color artifacts into said Gray Code representation.

12. The method of claim 1, wherein the corresponding bit map models belong to a multimodal patch classifier, said multimodal patch classifier including a plurality of distinct patch sub-classifiers, each associated with a distinct corresponding mode of eye.

13. The method of claim 1, wherein:
    the classifying comprises:
        selecting at least a set of bits in given positions in at least a same bit map;
        performing an evaluation of a correlation function among bits belonging to a same at least one set of bits to obtain at least a resulting correlation value;

and wherein said comparing comprises:
    comparing said at least resulting correlation value with a corresponding expected value obtained evaluating the same correlation function among bits, spatially corresponding to bits of said set, belonging to a corresponding bit map model.

14. The method of claim 13, wherein said set is a set of two bits, and wherein said correlation function is a Boolean XOR function between bits of said set of two bits.

15. The method of claim 1, wherein said method, between the determining and the classifying, further comprises filtering said patch to obtain a filtered patch and wherein said converting within the classifying and said obtaining within the classifying are performed starting from said filtered patch.

16. The method of claim 15, wherein said filtering of said patch comprises performing one or more of the following types of filtering operations substantially in parallel: Luminance; Diagonal gradient; Horizontal gradient; Vertical gradient; Gaussian Logarithm; or Gaussian.

17. The method of claim 15, wherein said filtering of said patch is adapted to provide, through said subsequent converting within the classifying and said obtaining within the classifying, at least one additional bit map with respect to said plurality of bit maps, said plurality of bit maps being obtained starting from R, G, B values of said pixels.

18. The method of claim 1, wherein the digital image is an image in RGB format and wherein each pixel of the digital image comprises three digital values, R, G and B respectively, and wherein the classifying, converting, comparing and filtering is applied to each of said three digital values of each of the plurality of pixels of the patch of pixels wherein said filtering said patch is adapted to provide, through subsequent converting the digital values of said patch of pixels into a Gray Code and subsequent obtaining a plurality of bit maps from said patch of pixels, at least one additional bit map with respect to said plurality of bit maps, said plurality of bitmaps being obtained starting from the R, G, B values of said pixels.

19. An apparatus for processing digital images comprising:
    a memory; and
    a processor operatively coupled to the memory, the processor configured to perform the following:
        filtering an eye color artifact from a digital image that includes a plurality of pixels each having a digital value, the filtering including:
            determining that a patch of pixels of the digital image includes pixels potentially representative of the eye color artifact;
            classifying the patch of pixels as "eye" or "non-eye" based on whether the patch is determined as representing an eye; and
            filtering said pixels potentially representative of the eye color artifact if said patch of pixels is classified as "eye";
            wherein the classifying comprises:
                converting the digital values of said patch of pixels into a Gray Code representation that includes a plurality of bits,
                obtaining a plurality of bit maps from said patch of pixels, each bit map being associated with a respective bit of the plurality of bits said Gray Code, and
                individually comparing said bit maps with corresponding bit map models.

20. The apparatus of claim 19 wherein the comparing is performed using a respective selected and limited sub-set of bits for each bit map of said plurality of bit maps.

21. The apparatus of claim 19 wherein the processor is further configured to perform producing the patch classifier before the comparing, the producing including using an automatic learning algorithm based on a boosting technique.

22. The apparatus of claim 19 wherein the digital image is an image in RGB format and wherein each pixel of the digital image comprises three digital values, R, G and B respectively, and wherein the classifying, converting, comparing and filtering is applied to each of said three digital values of each of the plurality of pixels of the patch of pixels.

23. The apparatus of claim 19, wherein the processor is further configured to perform detecting color of the digital image, the detecting including performing a Principal Component Analysis-type transformation of the digital image into an ad hoc representation in a multidimensional color space.

24. The apparatus of claim 23 wherein the detecting comprises performing the Principal Component Analysis-type transformation starting from representations of said digital image in two distinct linear color spaces to obtain a representation of the digital image in a single three-dimensional space with independent components.

25. A non-transitory computer readable storage medium comprising computer executable instructions thereon for performing a method that includes:
    filtering an eye color artifact from a digital image that includes a plurality of pixels each having a digital value, the filtering including:
        determining that a patch of pixels of the digital image includes pixels potentially representative of the eye color artifact;
        classifying the patch of pixels as "eye" or "non-eye" based on whether the patch is determined as representing an eye; and
        filtering said pixels potentially representative of the eye color artifact if said patch of pixels is classified as "eye";
        wherein the classifying comprises:
            converting the digital values of said patch of pixels into a Gray Code representation that includes a plurality of bits,
            obtaining a plurality of bit maps from said patch of pixels, each bit map being associated with a respective bit of the plurality of bits said Gray Code, and
            individually comparing said bit maps with corresponding bit map models.

26. The computer readable medium of claim 25 wherein the comparing includes using a respective selected and limited sub-set of bits for each bit map of said plurality of bit maps.

27. The computer readable medium of claim 25 further including computer executable instructions for producing the patch classifier before the comparing, the producing including using an automatic learning algorithm based on a boosting technique.

28. The computer readable medium of claim 25 wherein the digital image is an image in RGB format and wherein each pixel of the digital image comprises three digital values, R, G and B respectively, and wherein the classifying, converting, comparing and filtering is applied to each of said three digital values of each of the plurality of pixels of the patch of pixels.

29. The computer readable medium of claim 25, further including computer executable instructions for detecting color of the digital image, the detecting including performing a Principal Component Analysis-type transformation of the digital image into an ad hoc representation in a multidimensional color space.

* * * * *